United States Patent
Lau

(10) Patent No.: US 9,882,411 B2
(45) Date of Patent: Jan. 30, 2018

(54) LITHIUM-ION BATTERY AND CHARGE/DISCHARGE CONTROL METHOD

(71) Applicant: MINWA ENERGY LITHIUM BATTERY TECHNOLOGY CO. LIMITED, Hong Kong (HK)

(72) Inventor: Hak Wah Lau, Hong Kong (HK)

(73) Assignee: MINWA ENERGY LITHIUM BATTERY TECHNOLOGY CO. LIMITED, Hong Kong (HK)

( * ) Notice: Subject to any disclaimer, the term of this patent is extended or adjusted under 35 U.S.C. 154(b) by 45 days.

(21) Appl. No.: 15/190,161

(22) Filed: Jun. 22, 2016

(65) Prior Publication Data

US 2016/0294207 A1 Oct. 6, 2016

Related U.S. Application Data

(63) Continuation-in-part of application No. PCT/CN2015/086247, filed on Aug. 6, 2015.

(30) Foreign Application Priority Data

Aug. 8, 2014 (HK) .................................. 14108170.9

(51) Int. Cl.
*H02J 7/00* (2006.01)
*H01M 10/0525* (2010.01)
(Continued)

(52) U.S. Cl.
CPC .............. *H02J 7/0081* (2013.01); *H01M 2/26* (2013.01); *H01M 10/052* (2013.01);
(Continued)

(58) Field of Classification Search
CPC ....... Y02E 60/12; H02J 7/0042; H02J 7/0045; H01M 10/46; H01M 10/44
(Continued)

(56) References Cited

U.S. PATENT DOCUMENTS 5,729,116 A * 3/1998 Tsenter ................. H01M 10/44
320/151
8,263,240 B2 9/2012 Uh
(Continued)

FOREIGN PATENT DOCUMENTS

CN 100401564 C 7/2008

*Primary Examiner* — Arun Williams
(74) *Attorney, Agent, or Firm* — Wayne & King LLC

(57) ABSTRACT

A lithium-ion battery includes a lithium-ion cell, a positive electrode terminal, a positive/negative electrode insulation sheet, a connector and a housing used as a negative electrode. The lithium-ion cell is arranged in the housing, the connector is arranged between the lithium-ion cell and the housing. The positive electrode terminal is installed on one end of the lithium ion cell. A circuit board is arranged between the battery positive/negative electrode and the lithium-ion cell. A voltage/current control and overcharge/over-discharge protection circuit is integrated on the circuit board. The voltage/current control and overcharge/over-discharge protection circuit can adjust the voltage of the lithium-ion battery to be a voltage of 1.5V/1.2V. The shape and size of the housing can be designed to be any shapes to replace traditional dry batteries according to requirements. The lithium-ion battery can be designed to be using the same port to do the discharging and charging work.

7 Claims, 3 Drawing Sheets

(51) Int. Cl.
*H01M 2/26* (2006.01)
*H01M 10/42* (2006.01)
*H01M 10/44* (2006.01)
*H01M 10/46* (2006.01)
*H01M 10/052* (2010.01)
*H01M 2/02* (2006.01)

(52) U.S. Cl.
CPC ... *H01M 10/0525* (2013.01); *H01M 10/4257* (2013.01); *H01M 10/44* (2013.01); *H01M 10/46* (2013.01); *H02J 7/0029* (2013.01); H01M 2/0225 (2013.01); H01M 2010/4271 (2013.01); H02J 2007/004 (2013.01); H02J 2007/0037 (2013.01); Y02E 60/122 (2013.01)

(58) Field of Classification Search
USPC .......................................................... 320/107
See application file for complete search history.

(56) References Cited

U.S. PATENT DOCUMENTS

| | | | |
|---|---|---|---|
| 8,835,025 B2 | 9/2014 | Byun | |
| 2002/0026707 A1* | 3/2002 | Yamasaki | C01G 23/005 29/623.2 |
| 2003/0117141 A1* | 6/2003 | Gerald, II | B82Y 15/00 324/322 |
| 2004/0018432 A1* | 1/2004 | Adachi | H01M 4/13 429/343 |
| 2004/0251872 A1* | 12/2004 | Wang | H01M 2/1061 320/112 |
| 2006/0141355 A1* | 6/2006 | Kang | H01M 2/0404 429/182 |
| 2009/0115374 A1* | 5/2009 | Noda | H01M 10/44 320/138 |

\* cited by examiner

LITHIUM-ION BATTERY AND CHARGE/DISCHARGE CONTROL METHOD

CROSS-REFERENCE TO RELATED APPLICATIONS

This application is a continuation-in-part of International Patent Application No. PCT/CN2015/086247 with a filing date of Aug. 6, 2015, designating the United States, now pending, and further claims priority to Hong Kong Patent Application No. 14108170.9 with a filing date of Aug. 8, 2014. The content of the aforementioned applications, including any intervening amendments thereto, are incorporated herein by reference

TECHNICAL FIELD

The present disclosure relates to batteries for power supplying electronic circuits, and more particularly to a lithium-ion battery and a charge/discharge control method.

BACKGROUND OF THE PRESENT INVENTION

Batteries are indispensable parts in electronic devices and more particularly in portable electronic products. It's very convenient to use an electronic device to digital camera, a toy or a remote controller etc.) with a battery, because the battery can independently provide power to the electronic device. At present, there are mainly two types of batteries. One type is traditional batteries. The traditional batteries have standard shapes and standard sizes, such as AA or AAA cylinder-shaped batteries with rating voltage of 1.5 volts. In most cases, this kind of batteries is a dry battery. fewer cases, this kind of battery is a nickel-cadmium or hydrogen-nickel rechargeable battery with rating voltage of 1.2 volts. Another type is a battery for an exclusive application. This kind of batteries is manufactured by different suppliers or is using for different products, thus, it has different shapes and sizes. In most cases, this kind of batteries has a rating voltage of 3 volts or 3.6 volts. Among this kind of batteries, lithium batteries with the rating voltage of 3.6 volts or 3.7 volts are most widely used.

Shapes and sizes of the traditional batteries must follow technical standards. It is convenient for widely manufacturing and widely using. A traditional battery has a good commonality. However, expenditure of using disposable dry batteries is large. It is not economic for a consumer to use lots of disposable dry batteries. Further, discarded batteries would pollute the environment. As to the nickel-cadmium or hydrogen-nickel batteries, they have memory effects and short cycle lives. Meanwhile, discarded batteries polluting the environment are still problems needed to solve.

Lithium-ion batteries have features of high energy density, long service times, no memory effects, long cycle lives, free of heavy metal. The lithium-ion batteries substitute the traditional dry batteries gradually. However, shapes and sizes of the lithium-ion batteries are so different that they have poor commonality. It is not convenient that consumers have to buy suitable batteries in a specialty store. Further, because of the lithium-ion batteries outputting high voltage, the lithium-ion batteries are not suitable for electronic products of low voltage requirements. Therefore, the lithium-ion batteries still can't substitute all the traditional dry batteries nowadays. It's hard to promote the using of the lithium-ion batteries.

DESCRIPTION OF DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, all the views are schematic, and like reference numerals designate corresponding parts throughout the several views.

DETAILED DESCRIPTION OF PREFERRED EMBODIMENTS

Figure 1:
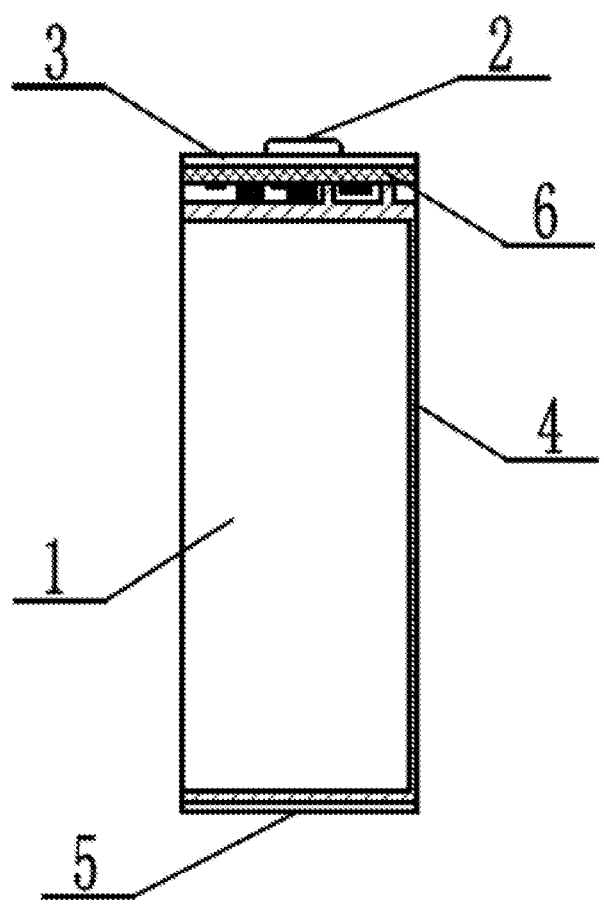
FIG. 1 shows a structure diagram of one embodiment of a lithium-ion battery in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a lithium-ion battery and a charge/discharge control method.

In at least one embodiment, the present disclosure is providing a lithium-ion battery which voltage is similar or close to a voltage of the traditional dry battery. A shape and a size of the lithium-ion battery are same to a shape and a size of the traditional dry battery. Further, the lithium-ion battery can be designed to be using the same port to do the discharging and charging work.

In order to achieve the above desired effects, the lithium-ion battery includes a lithium-ion cell, a positive electrode terminal, a positive/negative electrode insulation sheet, a connector and a housing. The connector is a Flexible Printed Circuit (FPC) insulation circuit board or a metal nickel belt attached insulation papers on the surface. The housing is a negative electrode of the lithium-ion battery. The lithium-ion cell is arranged in the housing. The connector is arranged between the lithium-ion cell and the housing. The connector is configured to connect electrodes in the lithium-ion cell. The positive electrode terminal is installed on one end of the lithium-ion cell. The positive electrode terminal and the housing are is ted and packaged by the positive/negative electrode insulation sheet. There is a circuit board integrated between the lithium-ion cell and the positive electrode terminal. A voltage/current control and overcharge/over-discharge protection circuit is integrated on the circuit board. Positive and negative electrodes of the lithium-ion battery are coupled to the lithium-ion cell through the voltage/current control and overcharge/over-discharge protection circuit. The voltage/current control and overcharge/over-discharge protection circuit can adjust the voltage of the lithium-ion battery to be a voltage of 1.5V/1.2V in order to meet, requirements of low voltage products.

Shapes and sizes of the housing can be various, such as cylinder shapes or cubic shapes with the same sizes of any traditional dry batteries. In addition, the lithium-ion battery can be designed to be using the same port to do the discharging and charging work to avoid increasing extra charging circuits.

A voltage/current control and overcharge/over-discharge protection circuit in the lithium-ion battery includes a Pulse-Width Modulation (PWM) voltage stabilization control unit, a charging detection unit and a charging and voltage stabilization control unit. The PWM voltage stabilization control unit, the charging detection unit and the charging and voltage stabilization control unit are coupled to each other through circuits in the circuit board In the embodiments, the PWM voltage stabilization control unit has two types.

In the first type, the PWM voltage stabilization control unit includes a PWM chip, a Metal-Oxide -Semiconductor Field Effect Transistor (MOSFET), an energy-storage inductor, a diode, a capacitor and a sampling circuit consisted of resistors.

In the second type, the PWM voltage stabilization control unit includes a PWM chip, a PWM voltage stabilization control circuit consisted of a MOSFET and a synchronous rectification MOSFET, an energy-storage inductor, a diode, a capacitor and a sampling circuit consisted of resistors The charging detection unit includes a first triode and a resistor. A first terminal of the resistor is coupled to a base electrode of the first triode. A second terminal of the resistor is coupled to a source electrode of the MOSFET in the PWM voltage stabilization control unit. An emitting electrode of the first triode is coupled to a drain electrode of the MOSFET in the PWM voltage stabilization control unit.

The charging and voltage stabilization control unit includes a second triode, a second resistor, a third resistor and a second capacitor, a collector electrode of the second triode is coupled to the feedback pin of the PWM chip, a first terminal of the second resistor is coupled to a base electrode of the second triode, a second terminal of the second resistor is coupled to the ground, a first terminal of the second capacitor is also coupled to the base electrode of the second triode, a second terminal of the second capacitor is also coupled to the ground, a first terminal of the third resistor is coupled to the first terminal of the second resistor, a second terminal of the third resistor is coupled to the charging detection unit, a collector electrode of the second triode is coupled to a feedback pin of the PWM chip. The second resistor and the second capacitor form a discharging circuit. Further, the discharging circuit is coupled to the base electrode of the second triode through the first terminal of the second resistor. The second terminal of the third resistor is coupled to the collector electrode of the first triode.

The charge/discharge control method applied in the lithium-ion battery includes steps as follow:

i): The charging detection unit detects current in circuits of the lithium-ion battery.

ii): If the charging detection unit detects discharging current in the circuits, the charging and voltage stabilization control unit stops working, the PWM voltage stabilization control unit is working. Thus, the positive electrode terminal of the lithium-ion battery outputs a stable voltage. At this time, the lithium-ion battery is in a discharging state.

iii): If the charging detection unit detects charging current in the circuits, the charging and voltage stabilization control unit is working, the PWM voltage stabilization control unit stops working. At the same time, a channel resistance of the MOSFET in the PWM voltage stabilization control unit is a minimum value. The resistance in the circuits is also a minimum value. At this time, the lithium-ion battery is in a charging state.

iv) When the lithium-ion battery is fully charged or a charger is pulled out, there is no current in the circuits. The charging detection unit, the charging and voltage stabilization control unit both stop working. The lithium-ion battery is in a standby state. At this time, the PWM voltage stabilization control unit turns on a PWM voltage stabilization mode.

In the embodiments, because of the using of voltage stabilization and voltage step-down circuits, output voltages of the lithium-ion batteries can be applied to electronic products using traditional dry batteries. Further, housings of the lithium-ion batteries can be designed to any shapes or sizes to replace the traditional dry batteries. Moreover, circuits in the lithium-ion batteries are simple, and the lithium-ion battery can be designed to be using the same port to do the discharging and charging work to reduce cost.

FIG. 1 shows a structure diagram of one embodiment of a lithium-ion battery in accordance with the present disclosure. As shown in FIG. 1, the lithium-ion battery includes a lithium-ion cell 1, a positive electrode terminal 2, a positive/negative electrode insulation sheet 3, a connector 4 and a cylinder-shaped housing 5. The connector 4 is a Flexible Printed Circuit (FPC) insulation circuit board or a metal nickel belt attached insulation papers on the surface. The housing 5 is a negative electrode of the lithium-ion battery. The lithium-ion cell 1 is arranged in the housing 5. The connector 4 is arranged between the lithium-ion cell 1 and the housing 5. The positive electrode terminal 2 is installed on one end of the lithium-ion cell 1. The positive electrode terminal 2 and the housing 5 are isolated and packaged by the positive/negative electrode insulation sheet 3.

The lithium-ion battery further includes a circuit board 6, The circuit board 6 is arranged between the lithium-ion cell 1 and the positive electrode terminal 2. A voltage/current control and overcharge/over-discharge protection circuit is integrated on the circuit board 6. The positive electrode terminal 2 is coupled to the lithium-ion cell 1 through the voltage/current control and overcharge/over-discharge protection circuit.

The voltage/current control and overcharge/over-discharge protection circuit includes a Pulse-Width Modulation (PWM) voltage stabilization control unit, a charging detection unit and a charging and voltage stabilization control unit. The PWM voltage stabilization control unit, the charging detection unit and the charging and voltage stabilization control unit are coupled to each other through circuits in the circuit board 6.

Figure 2:
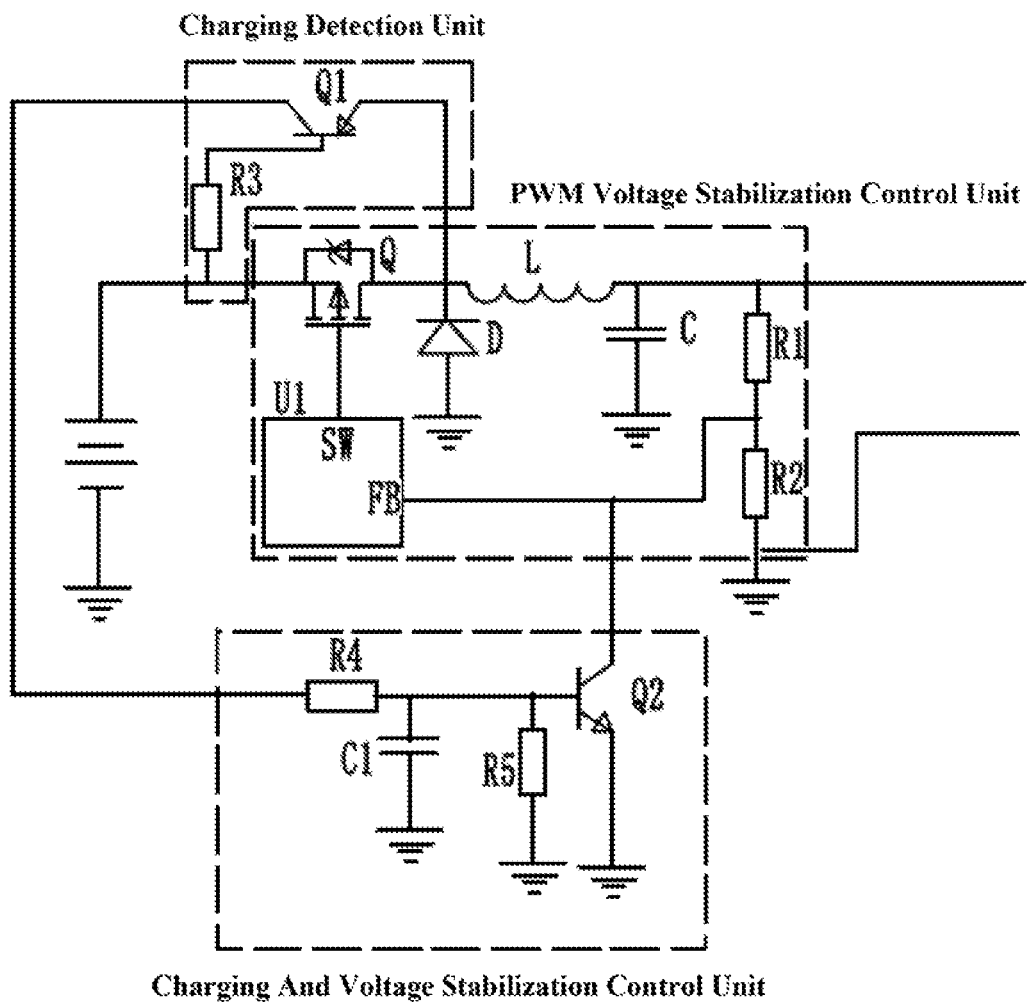
FIG. 2 shows a diagrammatic view of units of a circuit embodiment.

FIG. 2 shows a diagrammatic view of units of a circuit in a first embodiment. In the first embodiment, the PWM voltage stabilization control unit includes a PWM chip U1, a Metal-Oxide-Semiconductor Field Effect Transistor (MOSFET) Q, an energy-storage inductor L, a diode D, a capacitor C and a sampling circuit consisted of resistors R1 and R2.

A PWM control pin of the PWM chip U1 is coupled to the MOSFET Q. The MOSFET Q is coupled to a first terminal of the energy-storage inductor L. A second terminal of the energy-storage inductor L is coupled to the sampling circuit. The sampling circuit is coupled to a feedback pin of the PWM chip U1. A negative electrode of the diode D is coupled to the first terminal of the energy-storage inductor L. A positive electrode of the diode D is coupled to the ground. A first terminal of the capacitor C is coupled to the second terminal of the energy-storage inductor L. A second terminal of the capacitor C is coupled to the ground. The PWM voltage stabilization control unit is configured to be a voltage step-down circuit to adjust a voltage of the lithium-ion battery from a voltage of 3.6 volts or 3.7 volts to a voltage of 1.5 volts or 1.2 volts.

The charging detection unit includes a triode Q1 and a resistor R3. A first terminal of the resistor R3 is coupled to a base electrode of the triode Q1. A second terminal of the resistor R3 is coupled to a source electrode of the MOSFET Q. An emitting electrode of the triode Q1 is coupled to a drain electrode of the MOSFET Q.

The charging and voltage stabilization control unit includes a triode Q2, a resistor R4, a resistor R5 and a capacitor C1. A collector electrode of the triode Q2 is coupled to the feedback pin of the PWM chip W. A first terminal of the resistor R5 is coupled to a base electrode of the triode Q2. A second terminal of the resistor R5 is coupled to the ground. A first terminal of the resistor R4 is coupled to the first terminal of the resistor R5. A second terminal of the resistor R4 is coupled to the ground through the capacitor C1. The resistor R4, the resistor R5 and the capacitor C1 form a discharging circuit. Further, the discharging circuit is coupled to the base electrode of the triode 02 through the first terminal of the resistor R5. The second terminal of the resistor R4 is coupled to the collector electrode of the triode Q1.

Figure 3:
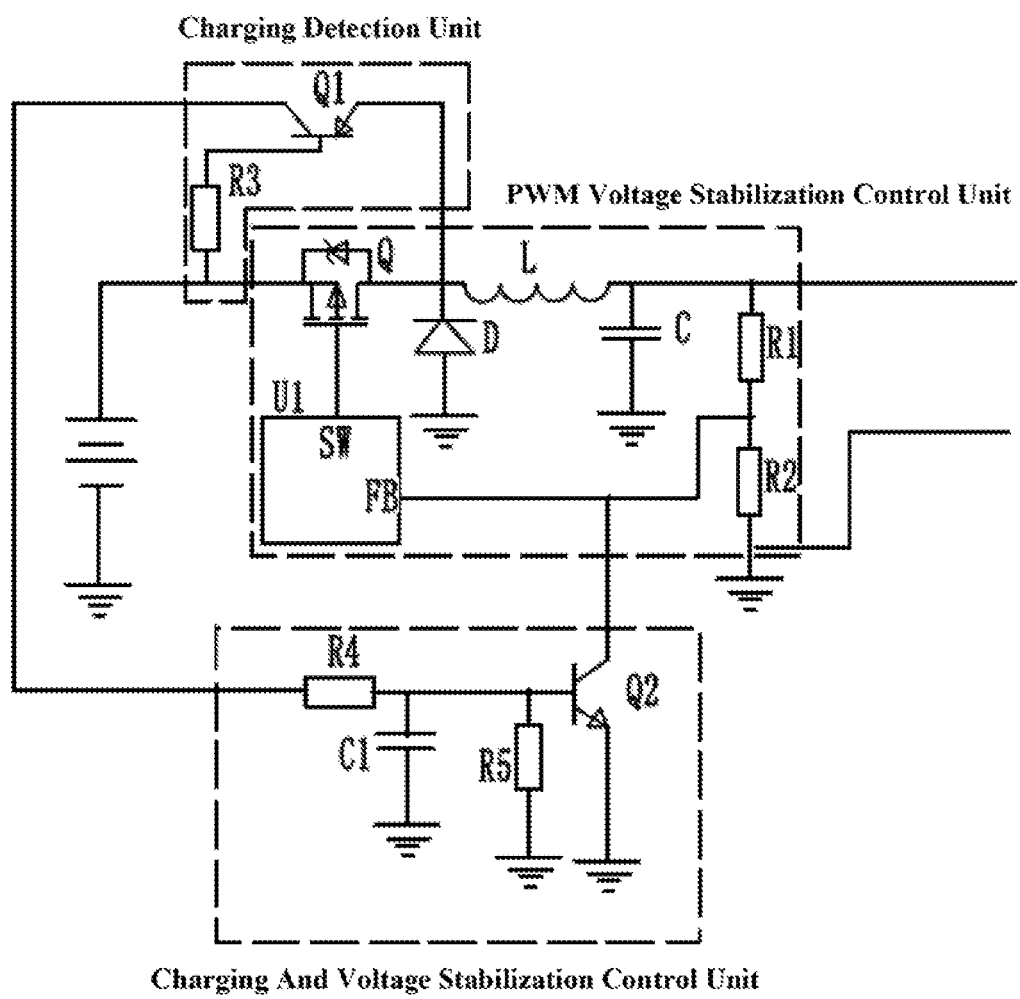
FIG. 3 shows a diagrammatic view of units of a circuit is a second embodiment.

FIG. 3 shows a diagrammatic view of units of a circuit in a second embodiment. Difference between the first embodiment and the second embodiment is that, structures of the PWM voltage stabilization control units in the first embodiment and the second embodiment are different. As shown in FIG. 3, in the second embodiment, the PWM voltage stabilization control unit includes a PWM chip U1, a PWM voltage stabilization control circuit consisted of a MOSFET Q and a synchronous rectification MOSFET QD, an energy-storage inductor L, a capacitor C and a sampling circuit consisted of resistors R1 and R2. The PWM control pin of the PWM chip U1 is coupled to control terminals of the MOSFET Q and the synchronous rectification MOSFET QD. A first terminal of the MOSFET Q is coupled to a first terminal of the synchronous rectification MOSFET QD. The first terminal of the MOSFET Q is coupled to a first terminal of the energy-storage inductor L. A second terminal of the energy-storage inductor L is coupled to the sampling circuit. The sampling circuit is coupled to a feedback pin of the PWM chip U1. A first terminal of the capacitor C is coupled to the second terminal of the energy-storage inductor L. A second terminal of the capacitor C is coupled to the ground. Thus, the PWM voltage stabilization control unit is highly integrated.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

I claim:

1. A lithium-ion battery comprising a lithium-ion cell, a positive electrode terminal, a positive/negative electrode insulation sheet, a connector and a housing;
   wherein the connector is a Flexible Printed Circuit (FPC) insulation circuit board or a metal nickel belt attached insulation papers on the surface, the housing is a negative electrode of the lithium-ion battery, the lithium-ion cell is arranged in the housing, the connector is arranged between the lithium-ion cell and the housing to connect electrodes in the lithium-ion cell, the positive electrode terminal is installed on one end of the lithium-ion cell, the positive electrode terminal and the housing are isolated and packaged by the positive/negative electrode insulation sheet, a circuit board is integrated between the lithium-ion cell and the positive electrode terminal, a voltage/current control and overcharge/over-discharge protection circuit is integrated on the circuit board, positive and negative electrodes of the lithium-ion battery are coupled to the lithium-ion cell through the voltage/current control and overcharge/over-discharge protection circuit.

2. The lithium-ion battery according to claim 1, wherein the voltage/current control and overcharge/over-discharge protection circuit comprises a PWM voltage stabilization control unit, a charging detection unit and a charging and voltage stabilization control unit, the PWM voltage stabilization control unit, the charging detection unit and the charging and voltage stabilization control unit are coupled to each other through circuits in the circuit board.

3. The lithium-ion battery according to claim 2, wherein the PWM voltage stabilization control unit comprises a PWM chip, a MOSFET, an energy-storage inductor, a diode, a first capacitor and a sampling circuit consisted of resistors;
   wherein a PWM control pin of the PWM chip is coupled to the MOSFET, the MOSFET is coupled to a first terminal of the energy-storage inductor, a second terminal of the energy-storage inductor is coupled to the sampling circuit, the sampling circuit is coupled to a feedback pin of the PWM chip, a negative electrode of the diode is coupled to the first terminal of the energy-storage inductor, a positive electrode of the diode is coupled to a ground, a first terminal of the first capacitor is coupled to the second terminal of the energy-storage inductor, a second terminal of the first capacitor is coupled to the ground.

4. The lithium-ion battery according to claim 2, wherein the charging detection unit comprises a first triode and a first resistor; wherein a first terminal of the first resistor is coupled to a base electrode of the first triode, a second terminal of the first resistor is coupled to a source electrode of the MOSFET in the PWM voltage stabilization control unit, an emitting electrode of the first triode is coupled to a drain electrode of the MOSFET in the PWM voltage stabilization control unit.

5. The lithium-ion battery according to claim 2, wherein the charging and voltage stabilization control unit comprises a second triode, a second resistor R4, a third resistor R5 and a second capacitor, a collector electrode of the second triode is coupled to the feedback pin of the PWM chip, a first terminal of the second resistor is coupled to a base electrode of the second triode, a second terminal of the second resistor is coupled to the ground, a first terminal of the second capacitor is also coupled to the base electrode of the second triode, a second terminal of the second capacitor is also coupled to the ground, a first terminal of the third resistor is coupled to the first terminal of the second resistor, a second terminal of the third resistor is coupled to the charging detection unit, a collector electrode of the second triode is coupled to a feedback pin of the PWM chip.

6. The lithium-ion battery according to claim 2, wherein the PWM voltage stabilization control unit comprises a PWM chip, a PWM voltage stabilization control circuit consisted of a MOSFET and a synchronous rectification MOSFET, an energy-storage inductor, a first capacitor and a sampling circuit consisted of resistors; wherein a first terminal of the MOSFET is coupled to a first terminal of the synchronous rectification MOSFET, the first terminal of the MOSFET is coupled to a first terminal of the energy-storage inductor, a second terminal of the energy-storage inductor is coupled to the sampling circuit the sampling circuit is coupled to a feedback pin of the PWM chip, a first terminal of the first capacitor is coupled to the second terminal of the energy-storage inductor, a second terminal of the first capacitor is coupled to a ground.

7. A charge/discharge control method applied in a lithium-ion battery comprising:

a charging detection unit detecting current in circuits of the lithium-ion battery;

wherein, a charging and voltage stabilization control unit stops working and a PWM voltage stabilization control unit is working to let the positive electrode terminal of the lithium-ion battery output a stable voltage when the charging detection unit detects discharging current in the circuits;

wherein, the charging and voltage stabilization control unit is working and the PWM voltage stabilization control unit stops working to let a channel resistance of the MOSFET in the PWM voltage stabilization control unit stay in a minimum value when the charging detection unit detects charging current in the circuits; and when the lithium-ion battery is fully charged or a charger is pulled out, the charging detection unit, the charging and voltage stabilization control unit both stop working and the PWM voltage stabilization control unit turns on a PWM voltage stabilization mode.

* * * * *